Jan. 23, 1968    F. W. GRAHAME    3,365,632
WOUND CAPACITOR

Filed June 14, 1966    2 Sheets-Sheet 1

INVENTOR.
FREDERICK W. GRAHAME

Jan. 23, 1968   F. W. GRAHAME   3,365,632
WOUND CAPACITOR

Filed June 14, 1966   2 Sheets-Sheet 2

INVENTOR.
FREDERICK W. GRAHAME

United States Patent Office 3,365,632
Patented Jan. 23, 1968

3,365,632
WOUND CAPACITOR
Frederick W. Grahame, Fort Edward, N.Y., assignor to General Electric Company, a corporation of New York
Filed June 14, 1966, Ser. No. 557,530
8 Claims. (Cl. 317—260)

ABSTRACT OF THE DISCLOSURE

A three-section, four-tap, wound capacitor unit where one foil strip (and tap) is the common electrode for each section, and where the fourth tap is adjacent the first tap to provide an RF capacitor section therebetween.

This invention relates to a multipurpose capacitor. It relates more particularly to a capacitor for a fluorescent ballast having power, starting and radio interference suppression sections all contained in the same housing and including a novel mode of terminating the sections for connecting them to external circuitry.

Fluorescent ballasts commonly employ a power capacitor, a starting capacitor and a radio interference suppression capacitor. Conventionally, the first two of these are wound as separate sections in a single capacitor roll housed in a can. The can has a sealed cover and the three terminals of the capacitor sections are led out of the can through insulating bushings in the cover. The radio interference suppression capacitor consists of a completely separate capacitor usually of the foil-paper type.

At first glance it might seem a simple and obvious thing to include the radio interference suppression capacitor as an additional section along with the other two sections in the aforementioned single capacitor roll. Actually, however, this is not the case. Due to several factors, such a step has never been really seriously considered, at least for the very large volume manufacture of the very low-cost capacitors found in fluorescent ballasts. In the first place, it has been thought that the addition of a third capacitor roll section having the required low impedance at radio frequencies and the ability to withstand the various testing procedures would require a very complex winding arrangement necessitating completely new and intricate winding machines.

Also, it is not economically feasible to include another terminal and its associated bushing in the housing cover. There is simply not enough room. Moreover, the addition of a fourth bushing to the capacitor unit would result in added losses during the electrical tests and even necessitate a hand testing step prohibitively increasing the overall cost of the capacitor unit.

Accordingly, the principal object of this invention is to provide a capacitor unit having three separate capacitor sections contained in a single sealed housing.

It is a further object of this invention to provide a low-cost capacitor unit which acts simultaneously as a power capacitor, a starting capacitor and a radio interference suppression capacitor in a rapid start fluorescent ballast.

Another object of this invention is to provide a three-section roll capacitor which can be made automatically at low cost using conventional winding equipment and conventional tap inserting techniques.

A still further object of this invention is to provide a capacitor unit having power, starting and radio interference suppression sections in which the suppression section can withstand the high test voltages required in standard ballast testing procedures.

Still another object of this invention is to provide a ballast capacitor with power, starting and radio interference suppression sections having a low power factor and in which the interference suppression section has low impedance at radio frequencies.

Another object of this invention is to provide a three-section capacitor unit requiring only three terminal bushings.

Another object of this invention is to provide an improved fluorescent ballast circuit employing a three-section capacitor having one or more of the above properties.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

Figure 1:
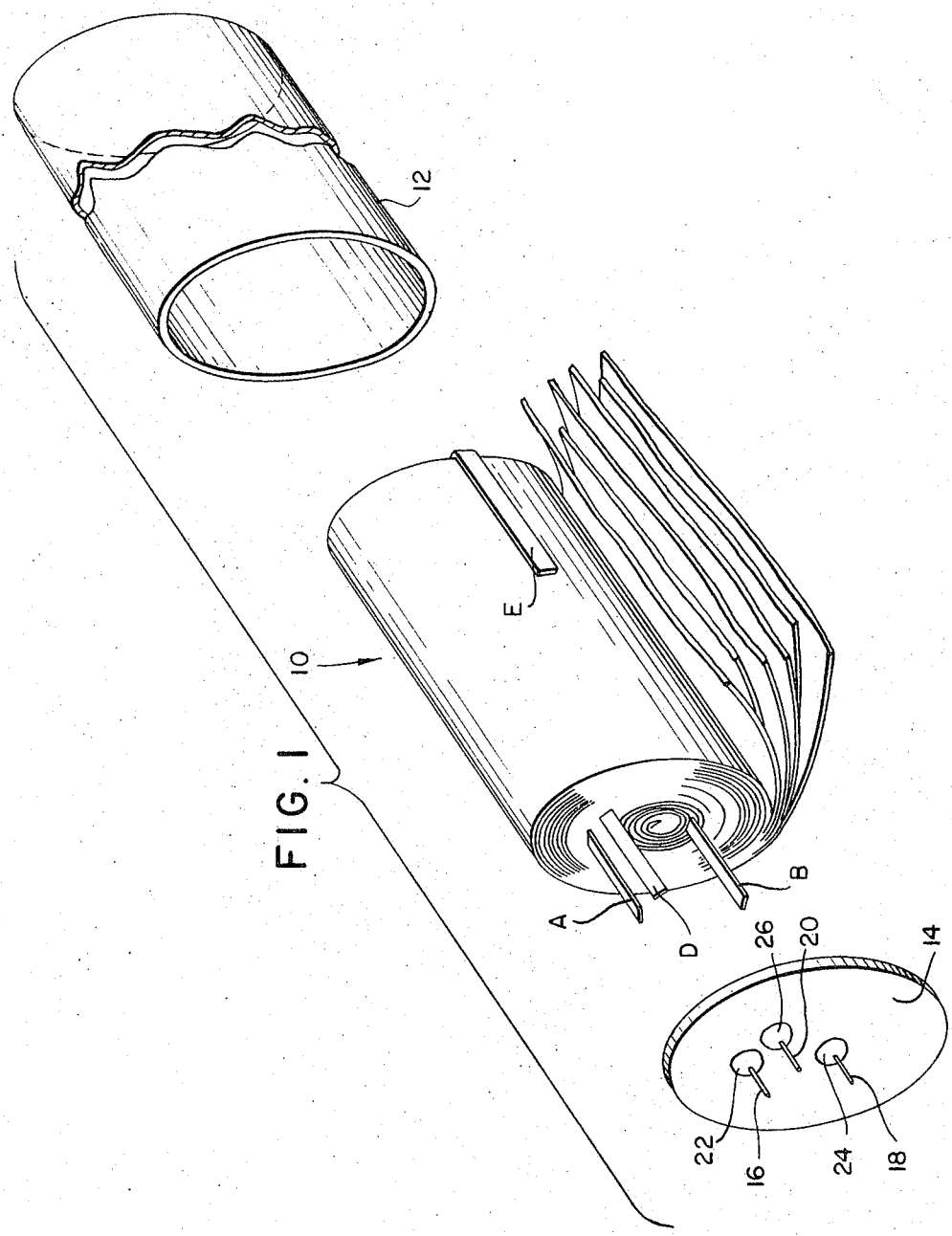
FIG. 1 is an exploded perspective view, with parts cut away, of a capacitor unit embodying the principles of this invention.

In general, my improved capacitor unit comprises several superimposed strips of conducting foil and insulating paper, all wound up in a single roll. The capacitor roll is housed in a protective can fitted with a sealed cover. Electrical leads are provided from the various conducting elements of the capacitor so that the unit may be connected to external circuitry.

The capacitor unit per se comprises a plurality of separate capacitor sections. In the ballast capacitor with which we are particularly concerned, there are three such sections, to wit: a large power section, a smaller starting section and a still smaller radio interference suppression section. Each capacitor section is made up of a pair of spaced foil electrodes, an intervening paper insulator and foil tap connections to the electrodes through which electrical contact is made to circuitry outside of the can. Each tap connection comprises simply a strip conductor of foil which contacts the corresponding foil electrode over an appreciable area, together with an integral tab or tap strap which extends out of the capacitor roll.

One of the electrodes and its tap connection are common to all three capacitor sections. This common electrode runs substantially the entire length of the unrolled composite capacitor strip. The remaining foil electrodes making up the three capacitor sections are arranged along the common electrode on opposite faces thereof.

The three capacitor sections are constructed and arranged so that when the composite strip is wound up into a roll, each section is insulated sufficiently to survive the various high-voltage tests which are performed on the capacitor unit itself and on the fluorescent ballast into which it is incorporated. Further, the taps making up the capacitor unit are situated relative to one another so that the capacitances and power factors of all three sections at the 60 cycle line frequency meet design criteria. Moreover, the radio interference suppression section presents a low impedance even at the higher radio frequencies, i.e. it has a very small inductance. The taps are inserted into the composite capacitor strip with conventional tap inserting techniques as the strip is being wound into a roll. Accordingly, the three-section capacitor can be fabricated with only a small increase in per unit cost over the conventional two-section ballast capacitors.

The capacitor roll is sealed in its can with three of the four tap straps leading to the capacitor electrodes being connected to terminals in the cover in the usual way. The fourth strap electrically contacts the can itself which then functions as the fourth terminal for the unit.

In a preferred embodiment of the invention, the fourth strap is folded back between the roll and the inside of the can. The roll and can are formed with oval cross sections having different eccentricities to insure excellent electrical contact between the tab and the can. In use, the capacitor unit is incorporated into a rapid start fluorescent ballast circuit with the terminals and the can being appropriately connected to the ballast transformer and the fluorescent tubes.

Referring more specifically to FIG. 1 of the drawings, my improved capacitor unit comprises a multisection capacitor roll indicated generally at 10. Roll 10 is, for example, a foil-paper capacitor employing several superimposed insulating and conducting electrode strips rolled up into a single unit. The tabs or tap straps A, B, D and E lead to the electrodes making up the various capacitor sections to be described in detail later. Preferably the capacitor roll 10 is wound so that it may be flattened to an oval cross section and is housed in a correspondingly ovular can 12 having a cover 14. Normally, the can 12 is filled with a dielectric fluid and a cover 14 is welded or soldered to the can, thereby hermetically sealing in the capacitor roll 10. The tap straps A, B and D are connected to terminals 16, 18 and 20, respectively, extending through insulating bushings 22, 24 and 26 in the cover 14.

The remaining tap strap E extends out the opposite end of the capacitor roll 10 from straps A, B and D and is folded back against the flattened outside wall of oval roll 10. The roll 10 is more rounded than can 12 so that when roll 10 is inserted into the can 12, the roll 10 presses this tap strap into firm electrical contact with the inside wall of the can.

Figure 2:
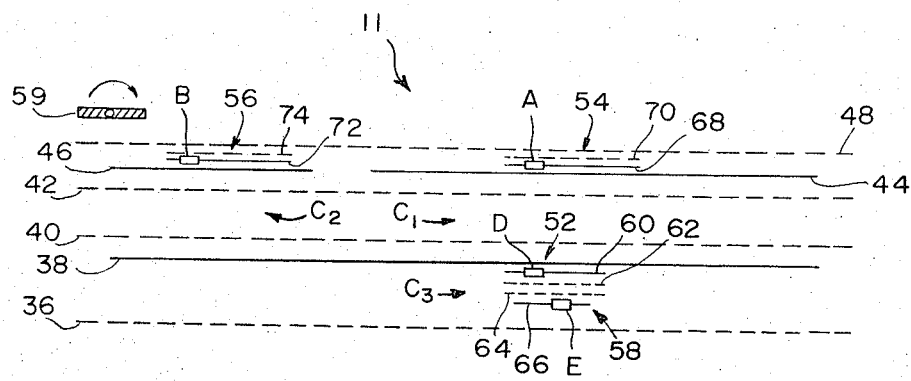
FIG. 2 is a schematic view showing the internal elements of the capacitor unit of FIG. 1 rolled out flat.

Refer now to FIG. 2, which shows roll 10 unwound and laid out flat to form a composite capacitor strip indicated generally at 11. The elements making up the composite strip have been spread apart and shortened considerably for ease of illustration. Further, for clarity, the conducting elements of the capacitors are indicated in solid line while the insulating elements are drawn in dotted lines.

As seen from FIG. 2, the composite capacitor strip 11 comprises three separate capacitor sections, to wit: a main power section indicated generally at $C_1$, a smaller starting section indicated generally at $C_2$ and a still smaller radio interference suppression section indicated generally at $C_3$. Each of the sections $C_1$, $C_2$ and $C_3$ comprises a pair of spaced apart electrodes and an intervening dielectric or insulator. The electrodes are simply long strips of aluminum foil while the insulators are the usual strips of paper impregnated with oil.

Proceeding upwardly from the bottom of FIG. 2, there is a dielectric in the form of a paper strip 36, a first foil strip electrode 38, a second dielectric in the form of a paper strip 40, and a third dielectric in the form of a paper strip 42. Second and third foil strip electrodes 44 and 46 respectively are spaced apart end-to-end on the paper strip 42, and finally a fourth or further insulating paper strip 48 overlies the two foil strips 44 and 46. All of the aforesaid paper and foil strips are sandwiched together, forming the long composite or laminated strip 11, which is wound up on an arbor to form the capacitor roll 10 in FIG. 1. As indicated in FIG. 2, all of the edges of the foil strips 38, 44 and 46 lie inwardly from the corresponding edges of the paper strips 36, 40, 42 and 48 to avoid short circuits between the various foil strips.

The foil strip 38 functions as the common electrode for all three capacitor sections $C_1$, $C_2$ and $C_3$. As such, it extends substantially the entire length of the composite strip 11. The foil strip 44 making up the other electrode of the main power section $C_1$ overlies the strip 38 along a major portion of its length. The foil strip 46 comprising the other electrode of the starting section $C_2$ also overlies the foil strip 38, but over a lesser portion of its length. The opposing electrode area of each capacitor section, along with the thickness and dielectric constant of the insulating paper, determines the capacitance of the section. In practice, the strip lengths can readily be adjusted to give each section the proper capacitance value to perform its function in the ballast circuit.

Still referring to FIG. 2, the electrical connection to the common electrode 38 is achieved by means of a first tap indicated generally at 52. Similar taps indicated generally at 54 and 56 (second and third respectively) are provided for the electrodes 44 and 46 respectively. A fourth tap indicated generally at 58 is positioned adjacent to tap 52 and functions by itself as the second electrode for the radio interference suppression section $C_3$. All of the aforementioned taps may be inserted into the sandwiched or laminated strip 11 by means of automatic tap inserting machines as the strip 11 is being wound by arbor 59 into a roll, as will be described in more detail later.

The tap 52 on the common electrode 38 comprises a rectangular foil strip conductor 60 which makes electrical contact with the electrode 38. Strip conductor 60 preferably extends across the width of electrode 38 but only a short distance along its length. The tap strap D is connected to the strip conductor 60 so as to extend out one end of roll 10 as seen in FIG. 1. A pair of superimposed, coextensive, rectangular, insulating means in the form of paper sections 62 and 64 are positioned between strip conductor 60 and the tap 58. The paper sections 62 and 64 have substantially the same dimensions as the foil strip conductor 60.

The tap 58 comprises a rectangular foil strip conductor 66 and a tap strap E which is secured to the strip conductor 66 so that it extends out the opposite end of roll 10 from the strap D as seen in FIG. 1. The width of the strip conductor 66 (i.e. its extent across strip 11) is substantially the same as that of electrode 38. The length of the strip conductor 66 (i.e. its extent along the composite strip 11) is such as to obtain the proper capacitance value in the section $C_3$. In any case, strip conductor 66 is slightly shorter than the paper sections 62 and 64 and is centered with respect to those elements so that there is no possibility of arcing between strip conductors 60 and 66 when the composite capacitor strip 11 is rolled up.

In order to achieve good radio interference noise suppression it is essential that section $C_3$ have a low impedance at radio frequencies. Of course, a pure capacitance would accomplish this objective. In practice, however, at radio frequencies, any portion of the common foil 38 lying between the terminals of section $C_3$ will give rise to a series inductance which raises the overall impedance of section $C_3$. It is apparent from FIG. 2 that the illustrated placement of tap 58 adjacent to tap 52 avoids any long inductive connection. This gives the radio interference suppression section $C_3$ a low net impedance at high frequencies and makes for a capacitor unit having a superior noise suppression capability.

The tap 54 comprises a foil strip conductor 68 in contact with electrode 44 and an overlying coextensive insulating paper section 70. The tap strap A connected to the foil strip conductor 68 extends out the same end of roll 10 as strap D (FIG. 1). The strip conductor 68 and paper section 70 making up the tap 54 lie directly opposite the taps 52 and 58. However, the strip conductor 68 and paper section 70 are slightly more than one turn of roll 10 longer than the strip conductor 60, and paper sections 62 and 64. The reason for this is that when strip 11 is rolled up, the tap 58 is displaced angularly around the roll with respect to tap 54. The length of strip conductor 68 and paper section 70 is such that fourth foil strip conductor 66 will still be directly opposite tap 54 when the roll 10 is formed. Accordingly it will be separated from electrode 44 by three insulating layers, i.e. 36, 48 and 70 instead of only two. This practice allows conventional tap inserting techniques to be employed to fabricate the capacitor, yet enables the radio interference suppression section $C_3$ to withstand the high voltages to which it is subjected during the hereinafter described tests. In fact, the capability of section $C_3$ to withstand voltage can be further increased to any desired value by utilizing thicker paper in paper section layers 62, 64, and 70 than is used for dielectric layers 36, 40, 42 and 46.

The tap 56 in the starting section $C_2$ comprises a rectangular third foil strip conductor 72 in face-to-face contact with electrode 46 and an overlying superimposed coextensive insulating paper section 74. The third strip conductor 72 and paper section 74 are substantially the third same width as, but somewhat shorter than, electrode 46. The tap strap B is connected to the third foil strip conductor 72 so that it extends out the same end of roll 10 as straps A and D (FIG. 1).

As mentioned previously, the taps 52, 54, 56 and 58 are inserted into the composite capacitor strip 11 as that is being wound up from the left in the direction indicated by the winding machine arbor 59. As the strip is being wound, first the tap 56 is inserted between electrode 46 and the insulating dielectric strip 48. It is positioned near the inner end of electrode 46 but as far away as possible from the arbor 59 at the beginning of the winding operation. Then, as winding continues, the two coextensive strips, conductor 68 and paper section 70, making up tap 54 are inserted by means of a conventional tap inserting machine. Another tap inserting machine is employed to insert the coextensive strips, conductor 60, and paper sections 62 and 64, and still another such machine inserts the smaller fourth strip conductor 66 making up tap 58. In practice, it is convenient to operate the machine inserting tap 58 as a slave of the machine inserting tap 52 because those two taps are symmetrically positioned. Through this technique, the placement of the taps 52, 54 and 58 can be very accurately controlled.

For certain applications, it may be desirable to have the starting section $C_2$ take the form of still another tap positioned in between the electrodes 40 and 44. In this event, the electrode 46 would be eliminated and the third strip conductor 72 and paper section 74 placed between dielectric strips 40 and 42, preferably with strap B between the straps A and D. Third strip conductor 72 would be made longer than before to give the section the required capacitive value. Paper section 74 would, of course, be of commensurate length to properly insulate the third strip conductor 72 from electrode 44.

Many advantages stem from this alternative construction. First, it eliminates the problem of positioning the tap 56 which arises during winding of the FIG. 2 capacitor because this tap is located so close to the arbor 59. With the alternative construction, the tap 56 can be located at any convenient point along the length of the common electrode 38. Actually, in practice, it is desirable to insert the tap at substantially the same time as taps 52 and 54. This permits exact placement of all of the taps relative to one another, thereby simplifying assembly of the unit and reducing assembly losses.

Also, the winding operation is speeded up because there is no further need to run the winding machine at slow speed for the first foot or so while the start section tap is being positioned.

Finally, with this alternative construction, the tap strap B for the start section need not be located at the very center of the capacitor roll 10. This allows greater flexibility in the placement of terminal 18 and its bushing 24 in the cover 14 (FIG. 1).

Referring again to FIG. 1, after the composite capacitor strip 11 is completely wound up into roll 10, the strap E of tap 58 is folded back against a flat side of the capacitor roll. Then the roll 10 is inserted into oval can 12 with the end of the roll containing the strap E entering first. As mentioned previously, the formed oval construction of the roll and can insures that the tap strap E is pressed firmly against the inside wall of can 12 and makes good electrical contact therewith.

After the tap straps A, B and D have been soldered to the insulated terminals 16, 18 and 20 respectively in the cover, the cover is soldered or welded all around to the can 12, thereby hermetically sealing in the capacitor roll 10. As seen from FIG. 1, the finished capacitor unit has the same number of terminals as a two-section capacitor, i.e. three, the fourth terminal being the can 12 itself.

While the herein described mode of connecting the tap 58 to the can 12 by folding the tap strap E back against the outside of roll 10 is preferable, there are other ways of making this electrical connection. For example, the tap strap E may be soldered to the inside of can 12 or to the inside of cover 14. Alternatively, it may be welded or soldered into the seam between the cover 14 and can 12 when those two elements are being secured together.

Figure 3:
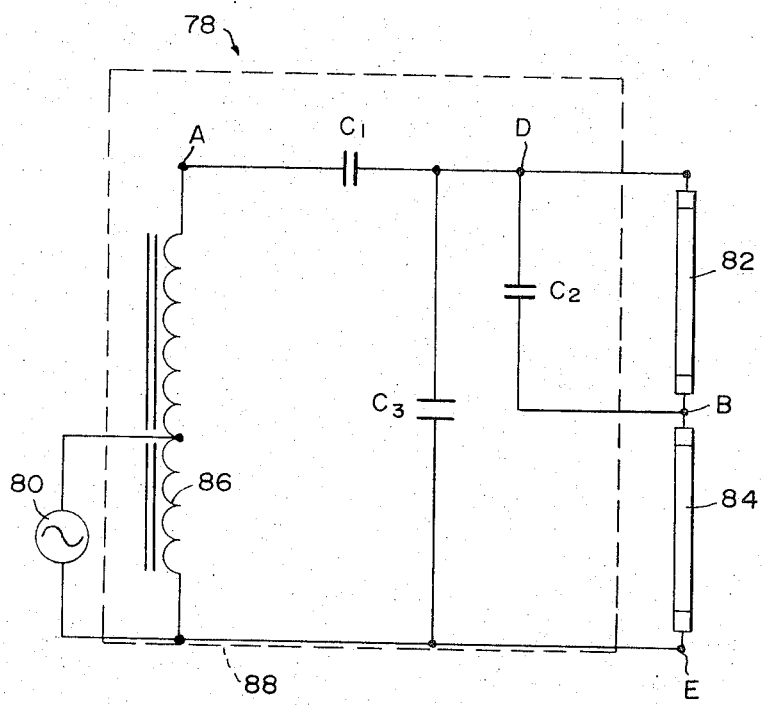
FIG. 3 is a schematic diagram of a ballast circuit incorporating the capacitor unit of FIGS. 1 and 2.

In FIG. 3, the capacitor roll 10 is shown incorporated into a rapid start fluorescent ballast circuit 78. The capacitors $C_1$, $C_2$ and $C_3$ illustrated in FIG. 3 correspond to the similarly designated capacitor sections in FIG. 2. Also, the designation of the terminal points in the circuit 78 corresponds to the designation of the tap straps illustrated in FIGS. 1 and 2.

The ballast circuit 78 is connected between an A.C. source 80 and a pair of fluorescent bulbs 82 and 84. Circuit 78 comprises an autotransformer 86 having its primary winding connected to source 80 and its secondary winding connected in series with capacitor section $C_1$ and fluorescent bulbs 82 and 84. The starting capacitor section $C_2$ is connected in parallel with the lamp 82, while the radio interference suppression capacitor section $C_3$ is connected across both bulbs 84 and 86. The ballast is housed in a case 88.

In conventional ballast manufacture, it is customary to connect the capacitor can 12 (FIG. 1) to the ballast case 88 for ease of assembly. It is also the usual practice to subject the ballast to a ground test voltage as high as 1800 v. A.C. This practice can still be followed in ballasts using my improved three-section capacitor. Thus, as seen in FIG. 3, the point E which corresponds electrically to the outside of the capacitor can 12 is connected to the ballast case 88. Even though section $C_3$ is in shunt with the transformer 86 secondary winding, it is still able to withstand the high test voltage because the tap 58 (FIG. 2) has extra dielectric on both sides thereof as described above.

It will be appreciated from the foregoing then that my improved three-section capacitor unit can be manufactured at a cost comparable to conventional two-section capacitors because it is fabricated using the same automatic winding and tap inserting techniques. Even with the added section in the capacitor roll, the capacitor unit requires no additional terminals or bushings in its housing. Further, the radio interference suppression section has low impedance at radio frequencies, giving the unit superior noise suppression capability and it can withstand the testing to which the standard fluorescent ballast circuits are subjected.

In the event that the starting section $C_2$ is included in the form of a separate tap between the electrodes 38 and 44 as described above, additional dielectric layers may be included there also to further insulate the starting section electrodes.

It will thus be seen that the objects set forth above among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, may be said to fall therebetween.

Having described my invention, what I claim as new and desire to secure by Letters Patent is:

1. A wound capacitor unit comprising
   (A) first and second strip electrodes spaced apart face-to-face,
   (B) an intervening dielectric strip,
   (C) first and second taps electrically connected to said first and second electrodes respectively, each said tap including
      (1) a foil strip conductor,
      (2) a coextensive insulator section in face-to-face contact with said strip conductor, said foil strip conductor also being in face-to-face electrical contact with its corresponding electrode, and
      (3) an electrical lead extending from said foil strip conductor out of said roll, said first and second electrodes and their corresponding taps forming one capacitor section,
   (D) a third strip electrode spaced from said first and said second electrode,
   (E) a third tap electrically connected to said third electrode, said third tap including
      (1) a third foil strip conductor, and
      (2) a coextensive insulator section in face-to-face contact with said third foil strip conductor, said third foil strip conductor also being in face-to-face electrical contact with said third foil strip electrode,
      (3) an electrical lead extending from said third foil strip conductor out of said roll, said third foil strip electrode being insulated from said first strip electrode by said intervening dielectric strip so as to form with said first electrode and its corresponding tap a second capacitor section.

2. A wound capacitor unit as defined in claim 1 and further comprising a fourth tap means positioned adjacent said first tap means, said fourth tap means comprising a strip conductor and an insulator section between said strip conductor and said first electrode to define a third capacitor section with said first electrode.

3. A wound capacitor unit as defined in claim 2 wherein said fourth tap is positioned close to said first tap and on the same side of said first electrode therewith so as to minimize the extent of said first electrode between said leads in said first and fourth taps and thereby minimize the series inductance in said third capacitor section.

4. A wound capacitor unit as defined in claim 3 wherein said fourth tap is so positioned relative to said second tap that in the wound capacitor unit said insulating paper section of said first tap opposes one face of said fourth tap and said insulating paper section of said second tap opposes the other face of said fourth tap.

5. A wound capacitor unit of the type having a laminated strip in roll form comprising
   (A) a first dielectric strip,
   (B) a first strip electrode facing said first dielectric strip,
   (C) a second dielectric strip facing said first electrode,
   (D) second and third electrodes, said electrode being
      (1) spaced apart end-to-end, and
      (2) facing said second dielectric strip,
   (E) a further dielectric strip facing said second and third electrodes,
   (F) first, second and third taps associated with said electrodes, said first tap being positioned between said first dielectric strip and said first electrode and electrically connected to said first electrode, said second tap being positioned between said second electrode and said further dielectric strip and electrically connected to said second electrode, said third tap being positioned between said third electrode and said further dielectric strip and electrically connected to said third electrode, said first and second taps being positioned opposite one another along said laminated strip, each of said taps comprising
      (1) insulating section means,
      (2) a coextensive strip conductor in face-to-face contact with said insulating section means and its corresponding electrode, and
      (3) an electrical lead extending from said conductive strip out of said roll,
   (G) a fourth tap comprising
      (1) a strip conductor, and
      (2) an electrical lead extending from said strip conductor out of said roll, the strip conductor of said fourth tap facing said insulating section means in said first tap so that its electrical lead is proximate to said lead in said first tap, said second tap being sufficiently longer than said third tap such that said insulating section means in said second tap lies between said third tap and said second electrode when said laminated strip is in roll form.

6. A capacitor unit of the type having a laminated strip in roll form as defined in claim 5 and further including
   (A) a conductive housing for said roll,
   (B) three insulated terminals in said housing,
   (C) means for connecting said electrical leads in said second, third and fourth taps to separate ones of said terminals, and
   (D) means for electrically connecting said electrical lead in said first tap to said housing.

7. A capacitor unit of the type having a laminated strip in roll form as defined in claim 5 and further including
   (A) means for electrically connecting a transformer between said second tap and said fourth tap,
   (B) means for connecting a first fluorescent lamp between said first tap and said third tap, and
   (C) means for connecting a second fluorescent lamp between said third tap and said fourth tap.

8. A wound capacitor unit comprising:
   (A) first, second and third spaced apart elongated strip electrodes,
   (B) said second and third electrodes being circumferentially spaced apart,
   (C) first, second and third taps electrically connected to said first, second and third electrodes, respectively, and extending from said unit,
   (D) an intervening dielectric strip spacing said first electrode from said second and third electrodes,
   (E) said first and second electrodes defining a first capacitor section therebetween,
   (F) said first and third electrodes defining a second capacitor section therebetween,
   (G) a fourth tap means positioned closely adjacent said first tap means including:
      (1) a foil strip conductor,
      (2) an electrical lead connected to said strip and extending out of said unit,
      (3) an insulating section between said strip conductor and said first and second electrodes so that a third and RF capacitor section is established between said fourth tap and said first tap,
   (H) said fourth tap being positioned closely adjacent said first tap to minimize the extent of said first electrode therebetween and thereby minimize series inductance in said third capacitor section.

References Cited

UNITED STATES PATENTS

| | | | |
|---|---|---|---|
| 1,337,505 | 4/1920 | Brinton | 317—260 |
| 3,024,393 | 3/1962 | Ferrante | 317—242 |
| 3,198,983 | 8/1965 | Feinberg | 317—260 |

FOREIGN PATENTS 596,700   6/1945   Great Britain.

OTHER REFERENCES

Elben: N8388, German printed application, published Sept. 13, 1956.

DARRELL L. CLAY, *Primary Examiner.*

L. H. MYERS, *Examiner.*

E. GOLDBERG, *Assistant Examiner.*